United States Patent

[11] 3,604,571

| | | | | |
|---|---|---|---|---|
| [72] | Inventor | Marvin C. Dobbs<br>Fayette, Ala. | 2,767,863 10/1956 Botley | 214/6 G |
| [21] | Appl. No. | 853,300 | 2,852,147 9/1958 Maydew | 214/2.5 |
| [22] | Filed | Aug. 27, 1969 | 2,878,947 3/1959 Thrasher | 214/6 K |
| [45] | Patented | Sept. 14, 1971 | 3,381,828 5/1968 Sheehan | 214/6 P |
| [73] | Assignees | The Dobbs Co.; | 3,417,854 12/1968 Bilocq | 214/6 K X |
| | | Alco Machine Shops, Incorporated | 3,508,672 4/1970 Stanoy et al. | 214/41 |
| | | , part interest to each | 3,513,991 5/1970 McWilliams | 214/41 X |
| | | | 3,515,292 6/1970 Oborny | 214/6 B |

Primary Examiner—Gerald M. Forlenza
Assistant Examiner—Robert J. Spar
Attorney—Jennings, Carter & Thompson

[54] APPARATUS FOR TRANSFERRING LOGS TO CARRIER THEREFOR
1 Claim, 3 Drawing Figs.

[52] U.S. Cl. .................................................. 214/6 G, 214/41
[51] Int. Cl. .................................................. B65g 57/112
[50] Field of Search .................................. 214/6 G, 6 H, 6 D, 6 P, 6 K, 6 B, 41, 2.5, 3

[56] References Cited
UNITED STATES PATENTS
2,603,365 7/1952 Moores .................... 214/41

ABSTRACT: Log transfer apparatus having pivoted chute delivering logs sequentially to the receiving end of a conveyor extending transversely over and adapted for vertical adjustment relative to a subjacent supporting carrier. Relative horizontal movement between the carrier and the conveyor positions carrier for receiving logs along the length of the carrier. The logs are released onto the carrier by upstanding, pivoted plates in response to movement of logs a predetermined distance along conveyor.

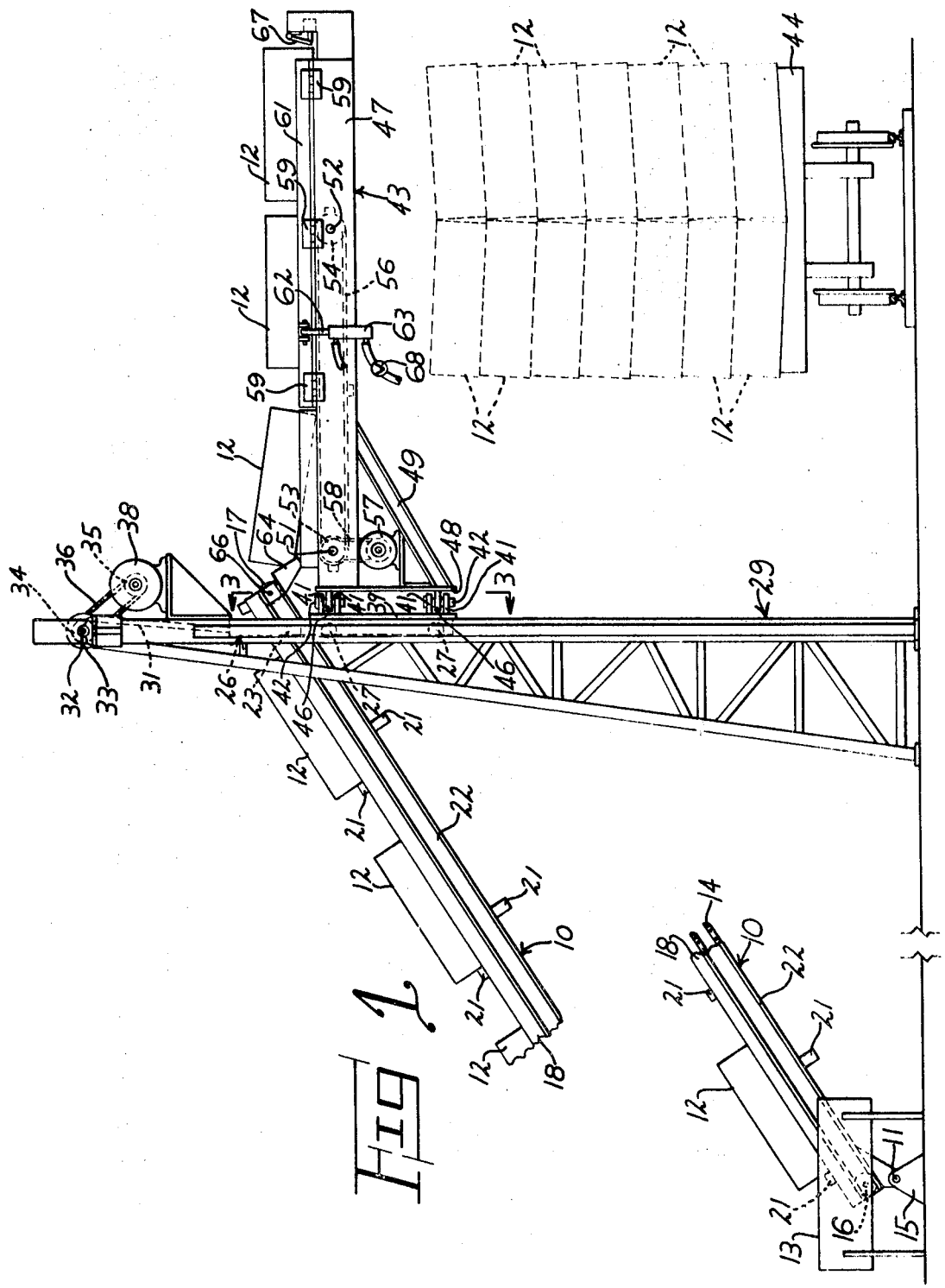

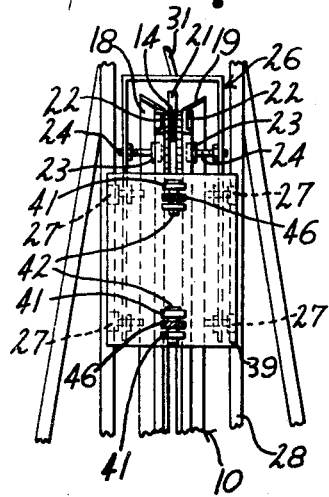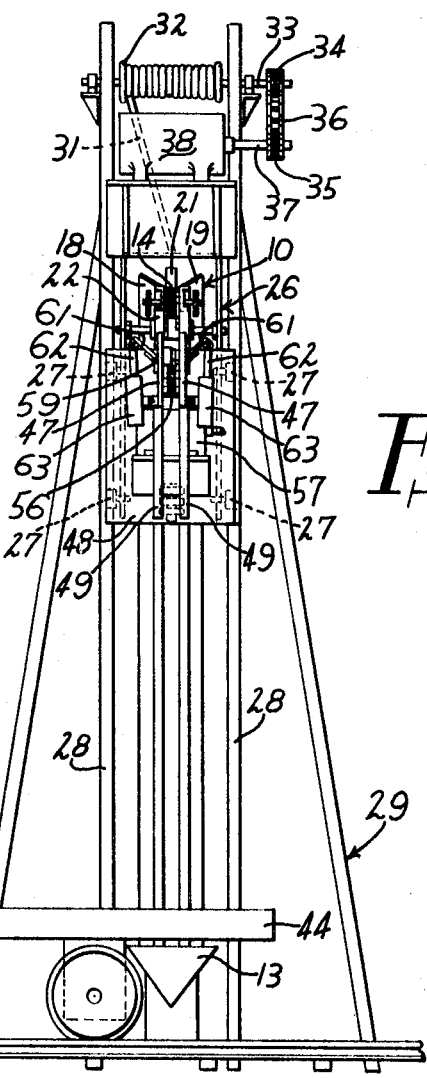

APPARATUS FOR TRANSFERRING LOGS TO CARRIER THEREFOR

BACKGROUND OF THE INVENTION

This invention relates to apparatus for transferring logs to a carrier therefor and is particularly adapted for transferring logs of predetermined lengths, such as lengths of pulpwood, onto railroad cars or the like.

A more specific object of my invention is to provide apparatus of the character designated which shall receive logs of a predetermined length and then automatically release the logs for movement into a subjacent carrier whereby the logs are positioned accurately within the carrier without requiring manual labor for positioning the logs.

Heretofore in the art to which my invention relates, considerable time and effort was required to transfer sections of logs, such as pulpwood sections, from the location at which the log was sawed into sections to a carrier, such as a railroad car. That is, apparatus heretofore employed for transferring logs or sections thereof onto a vehicle required the logs to be handled several times prior to reaching their ultimate position on the carrier.

BRIEF SUMMARY OF INVENTION

In accordance with my present invention, I provide apparatus wherein the logs are delivered sequentially to the receiving end of a conveyor unit which extends transversely over the carrier. The conveyor unit is adjustable vertically whereby the logs or log sections may be loaded from the bottom of the carrier upwardly. Relative horizontal movement between the carrier and the conveyor unit positions the carrier beneath the discharge portion of the conveyor unit and the logs are released onto the carrier in response to movement of the logs a predetermined distance along the conveyor. Apparatus embodying features of my invention is illustrated in the accompanying drawings, forming a part of this application in which:

FIG. 1 is a side elevational view, partly broken away and in section, showing my improved apparatus in position to discharge log sections onto a vehicle;

FIG. 2 is an elevational view as viewed from the right side of the apparatus shown in FIG. 1, parts being broken away and in sections; and FIG. 3 is a detail sectional view taken generally along the line 3—3 of FIG. 1.

Referring now to the drawings for a better understanding of my invention, I show an upwardly inclined conveyor 10 which is pivotally connected by a pivot pin 11 to upstanding brackets 15 whereby the upper end of the conveyor 10 is adapted for vertical movement. Logs or sections of logs, indicated at 12 are delivered to the receiving end of the conveyor 10 by suitable means. Preferably a trough 13 is provided adjacent the lower end of conveyor 10 for retaining the logs in alignment with the receiving end of conveyor 10. The conveyor 10 comprises an endless conveyor chain 14 which passes around sprockets 16 and 17, as shown in FIG. 1. As shown in FIGS. 2 and 3, upwardly and outwardly extending sides 18 and 19 are provided on the conveyor 10 for guiding the logs 12 upwardly toward the discharge end of conveyor 10. A plurality of spaced-apart, outwardly extending projections 21 are carried by the endless conveyor chain 14 in position to engage the logs 12, as shown in FIG. 1 whereby they are conveyed positively toward the upper or delivery end of conveyor 10.

The conveyor 10 is provided with longitudinally extending channellike side members 22 which are adapted to receive rollers 23 carried by short shaft members 24 which in turn are secured to a vertically movable frame 26. Accordingly, as the frame 16 moves vertically, the rollers 23 engage the channellike members 22 whereby the upper end of conveyor 10 is adapted to move vertically to selected positions along with the movable frame 26.

The movable frame 66 is provided with vertically spaced pairs of rollers 27 which are adapted to ride within vertically extending channel members 28 which form side members for an upstanding supporting frame indicated generally at 29. The upper end of movable frame 26 is connected by a flexible member 31 to a suitable winch unit 32 whereby the movable frame is moved to selected positions, The winch unit 32 is mounted on a supporting shaft 33 carrying a sprocket 34 which is operatively connected to a drive sprocket 35 by a sprocket chain 36. Drive sprocket 35 is mounted on a shaft 37 of a motor 38.

Secured rigidly to the movable frame 26 and forming a part thereof is a vertical plate 39 having outwardly projecting pairs of brackets 41 which are spaced vertically from each other, as shown in FIG. 1. Pivotally connected to the pairs of brackets 41 by suitable pivot pins 42 is an outwardly projecting conveyor unit indicated generally at 43. By supporting the conveyor unit 43 by the pivot pins 42 which are in vertical alignment with each other, the conveyor unit 43 is adapted to move from the position shown in FIG. 1 over a carrier 44, such as a railroad car having supporting wheels which ride on rails, as shown in FIGS. 1 and 2, to a position alongside the supporting frame 29. As shown in FIGS. 1 and 3, the conveyor unit 43 is provided with outwardly projecting brackets 46 which extend between the brackets 41 and receive the pins 42 to thus connect conveyor unit 43 to supporting frame 29.

The conveyor unit 43 comprises a pair of elongated frame members 47 which are rigidly connected to each other adjacent one end thereof by a vertical plate 48. Suitable diagonal braces 49 are interposed between the members 47 and 48, as shown. Mounted for rotation between the elongated members 47 on suitable shafts 51 and 52 are sprockets 53 and 54, respectively, for receiving a flexible conveyor chain 56. The shaft 51 is operatively connected to a motor 57 by a suitable flexible drive 58.

Pivotally connected to each of the elongated members 47 by suitable hinges 59 is an upwardly and outwardly extending log retainer member 61. The upper ends of the log retainer members 61 are pivotally connected to the upper ends of piston rods 62 of fluid-pressure-operated cylinders 63 whereby selected ones of the log retainer members 61 may be moved to a lower log release position to thus release the logs 12 whereby they move onto the carrier 44.

The logs are delivered from the discharge end of conveyor 10 to the receiving end of conveyor chain 56 by a movable chute 64 which is pivotally connected by pivot pin 66 to the upper end of conveyor 10. Accordingly, as the upper end of conveyor 10 moves downwardly the free, lower end of chute 64 moves outwardly to deposit the logs 12 onto the conveyor chains 56 of conveyor unit 43.

Mounted adjacent the free end of the conveyor unit 43 is a switch element 67 which is engaged by the forward end of he forwardmost log 12 as it moves beyond the position shown in FIG. 1. The switch element 67 is operatively connected to a suitable control valve indicated at 68 whereby fluid is introduced into selected ones of the cylinders 63 to lower its log retainer member 61 whereby two log sections 12 are delivered onto the carrier 44. However, while I have shown two log sections 12 as being delivered at a time onto the carrier 44, it will be apparent that one or more log sections may be delivered at a time by varying the lengths of the log retainer member 61 and the position of the switch element 67. It will be understood that when logs 12 are deposited initially on the carrier 44, the conveyor unit 43 would be at a lower position adjacent the upper surface of carrier 44 whereby the logs would not fall a great distance.

From the foregoing description, the operation of my apparatus for transferring logs to a carrier therefor will be readily understood. The logs 12 are delivered continuously to the receiving or lower end of conveyor 10 whereupon they are then elevated to the receiving end of conveyor unit 43. As the leading end of the forwardmost log 12 engages switch element 67, one of the log retainer members 61 is moved to lowered position by its fluid pressure cylinder 63 whereby two log sections 12 are delivered to the carrier 44. The conveyor unit 43 would be at a lower position adjacent the carrier 44 at the beginning of the loading operation and each time a layer of log sections are deposited, the conveyor unit 43 would be elevated to a position to deposit another layer of log sections.

The carrier 44 is moved relative to the overhead conveyor unit 43 as the logs 12 are deposited two at a time transversely of the carrier. The apparatus is so arranged that the log retainer member 61 trailing the direction of movement of the carrier 44 is lowered to log release position each time the switch element 67 is actuated by a log. At the end of the travel of carrier 44 to deposit a complete layer of log sections thereon, suitable trip mechanism is employed to cause switch element 67 to actuate the control valve 68 for the other fluid pressure operated cylinder whereby logs are discharged at the opposite side of conveyor unit 43 from the direction of travel of the subjacent carrier 44. The logs 12 are continuously delivered to the conveyor unit 43 sequentially in tandem relationship to each other whereby the logs 12 move longitudinally along the conveyor chain 56 and are then discharged while still in a position transversely of the carrier 44.

From the foregoing, it will be seen that I have devised improved apparatus for transferring logs to a carrier. By delivering the logs in a continuous manner to the conveyor unit 43, together with automatic release means for releasing a selected number of logs onto the carrier, these logs are positioned accurately in a transverse position on the carrier. By moving the logs substantially continuously along the conveyor 10 and conveyor unit 43, the logs are loaded onto the carrier in a minimum of time, thus further reducing the cost of operation.

While I have shown my invention in but one form, it will be obvious to those skilled in the art that is not so limited, but is susceptible of various other changes and modifications without departing from the spirit thereof.

What I claim is:

1. In apparatus for transferring logs to a movable carrier therefor:
   a. a conveyor unit extending transversely over said carrier,
   b. means supporting said conveyor unit at selected vertical positions over said carrier,
   c. an upwardly inclined conveyor adjustably supported at its upper end for movement to selected elevations for delivering logs sequentially and longitudinally in tandem to the receiving end of said conveyor unit,
   d. a movable chute pivotally connected at one end to the upper end of said inclined conveyor with the other end of said chute extending outwardly and downwardly over said conveyor unit for transferring logs from said inclined conveyor to said conveyor unit so that logs are moved over and transversely of said carrier,
   e. said carrier being movable horizontally relative to said conveyor unit in a direction generally perpendicular to said conveyor unit for receiving logs at selected positions along said carrier, and
   f. an upstanding platelike member pivotally mounted at its lower end adjacent at least one side of said conveyor unit and movable to a lower position for releasing said logs for movement from said conveyor unit onto said carrier in response to movement of logs to a predetermined position along said conveyor unit and over said carrier.